(12) United States Patent
Abbadessa et al.

(10) Patent No.: US 6,181,682 B1
(45) Date of Patent: Jan. 30, 2001

(54) NETWORK DISCOVERY METHOD AND APPARATUS FOR CELLULAR MOBILE RADIO NETWORKS

(75) Inventors: Daniele Abbadessa; Jan Schiefer, both of Bristol (GB)

(73) Assignee: Hewlett-Packard Company, Palo Alto, CA (US)

( * ) Notice: Under 35 U.S.C. 154(b), the term of this patent shall be extended for 0 days.

(21) Appl. No.: 08/988,112

(22) Filed: Dec. 10, 1997

(30) Foreign Application Priority Data

Dec. 11, 1996 (EP) .................................................. 96308987

(51) Int. Cl.[7] .................................................. H04B 7/216
(52) U.S. Cl. ........................ 370/328; 370/252; 455/67.1; 455/424
(58) Field of Search .................................... 370/252, 324, 370/328, 331, 349, 491, 500, 522; 455/436, 437, 438, 439, 443, 524, 525, 67.7, 423, 424, 67.1, 67.4; 579/229, 230, 245

(56) References Cited

U.S. PATENT DOCUMENTS

| 5,521,902 | 5/1996 | Ferguson . |
| 5,550,914 | * 8/1996 | Clarke et al. ........................ 379/230 |
| 5,793,752 | * 8/1998 | Clarke et al. ........................ 370/252 |

FOREIGN PATENT DOCUMENTS

| 0710043A1 | 10/1994 | (EP) . |
| 0738091A1 | 4/1995 | (EP) . |

OTHER PUBLICATIONS

European Search Report, EP 96 30 8987 Jun. 4, 1997.

ITG Specialist Report, No. 124, Sep. 1993, "GSM Signalling in Practice", pp. 1–13, Fingerle, (English translation provided).

* cited by examiner

*Primary Examiner*—Chi H. Pham
*Assistant Examiner*—Frank Duong

(57) ABSTRACT

A method and apparatus are provided for determining information about a cellular mobile radio network comprising a fixed part providing radio coverage in a plurality of cells, and mobile stations for communicating with the fixed part, the network broadcasting to all mobile stations within each cell a frequency allocated to the cell by the network operator and a code allocated to the cell by the network operator. The allocated frequency and code for each cell are determined by monitoring signalling messages passed between network elements, selecting a pair of signalling messages in accordance to predetermined selection criteria, establishing if the pair of messages are related to the same event within the network, and if so, extracting data from the pair of messages. A first embodiment determines the beacon frequency and BSIC of a cell of a GSM type cellular network and associates them with a TRX within the cell. A second embodiment associates the Cell Identity of a cell of a GSM type cellular network with the determined beacon frequency and BSIC.

10 Claims, 11 Drawing Sheets

NETWORK DISCOVERY METHOD AND APPARATUS FOR CELLULAR MOBILE RADIO NETWORKS

BACKGROUND OF THE INVENTION

1. Field of the Invention

The present invention relates to a network discovery method and apparatus for a cellular mobile radio network, and in particular to a network discovery method and apparatus for identifying frequencies and codes allocated to cells within such a network.

2. Description of Related Art

The present invention has particular application to cellular mobile radio systems operating according to the GSM, DCS1800, or the PCS1900 standards. Systems operating according to these standards, including derivatives thereof, will hereinafter be referred to as "GSM-type" systems. It should, however, be noted that the present invention is not restricted to a GSM-type system.

Cellular mobile radio systems, such as GSM-type systems, comprise a fixed part having switching elements and radio elements providing radio coverage in a plurality of cells, and mobile stations for communicating with the fixed part of the system. Cells are often logically grouped into location areas. Within each cell, radio coverage is provided by one or more radio elements, which, in the case of GSM-type systems, comprise elementary transceivers termed TRXs (Transmitter Receiver). Radio elements are grouped within Base Transceiver Stations (BTS) which communicate with Base Station Controllers (BSC). The interface between a BTS and BSC, within a GSM-type system, is referred to as the Abis interface, and individual links (generally comprising two physical channels) on this interface are termed Abis links. BSCs communicate with mobile switching centres (MSC) via what is termed the A interface.

Cellular mobile radio systems are based on the concept of frequency re-use, that is the use of the same frequency for communication with a mobile station by several cells which are far enough away from each other that interference is avoided. Frequency re-use greatly increases the capacity of the mobile radio system but also leads to greater complexity. For example, a means must be found for ensuring that a mobile station within any particular cell will be able to establish communication with the fixed part of the network on an appropriate frequency. GSM-type systems employ a frequency, known as the beacon frequency, which is broadcast continuously (ie. in every burst period) within each cell. This frequency is utilised by all common channels broadcast within the cell and any activated mobile station whether in idle mode (ie not in use by the user), or in active mode will listen to this beacon frequency.

Due to the scarcity of radio frequencies available for mobile communications, there are generally insufficient frequencies available to a network operator to ensure that a mobile station will not receive two identical beacon frequencies from different cells. To enable the mobile station to distinguish between cells in these circumstances a code, the BSIC (Base Station Identity Code), is broadcast frequently within each cell.

The beacon frequency and code for a particular cell are allocated by the network operator when planning frequency use within the network.

In order to monitor, and optimise, the performance of a cellular mobile radio network it may be necessary to determine the allocated frequency and code for particular cells within the network. Although this information may be derived from switching elements, such as BSCs and their related databases, within the fixed part of the network, there are problems in doing so. Firstly, although many aspects of GSM-type networks have been standardized, there are some areas in which equipment manufacturers have a number of technological choices which will meet the relevant standards, and other areas in which standardization has not been enforced. An area which is not highly standardized is that of Operation and Maintenance (O & M) messages. Thus in order to access 0 & M messages a specific, proprietary format which is unique to an equipment manufacturer may be required. Secondly, due to the highly sensitive nature of some information stored within the fixed part of a network, a network operator severely restricts access to databases associated with network switching elements such as BSCs and MSCs. Finally, there is no guarantee that the information stored within databases associated with switching elements is up to date, since changes made to the system may not have been incorporated into these databases.

It is known to carry out independent monitoring of the signalling network of a cellular mobile radio network, for example by temporarily or permanently installing monitor probes on one or more links to monitor messages flowing on the link or links. A number of techniques are known for monitoring signalling messages in order to determine various parameters of a cellular mobile radio system. For example, European patent application 0 710 043 discloses a technique for determining the location area information for cells within a GSM-type network, and European application 0 658 032 (U.S. Pat. No. 5,521,902) discloses a technique for identifying the A interface link on which a monitor probe is installed.

Co-pending US patent application with U.S. patent application Ser. No. 08/988,466, which is commonly owned with the present application and which claims priority from European patent application 96 3 08 986.7 published as European Publication No. 0848567 on Jun. 17, 1998 (filed on the same date as the priority application of the present application), is hereby incorporated by reference. This co-pending application discloses a network discovery method for identifying radio elements within a cellular mobile radio network.

BRIEF DESCRIPTION OF THE INVENTION

According to a first aspect of the present invention, there is provided a network discovery method for determining information about a cellular mobile radio network comprising a fixed part providing radio coverage in a plurality of cells, and mobile stations for communicating with the fixed part, the network broadcasting to all mobile stations within each cell a frequency allocated to the cell by the network operator and a code allocated to the cell by the network operator, the method comprising: monitoring signalling messages passed between network elements, selecting a pair of signalling messages in accordance to predetermined selection criteria, establishing if the pair of messages are related to the same event within the network, and if so, extracting data from the pair of messages and determining from the extracted data the allocated frequency and code for each cell. Thus a technique is provided for determining the beacon frequency and code allocated to a cell by a network operator simply by monitoring signalling messages and without the need to access information stored within the network.

Preferably, the selection criteria are that the messages relate to the handover of communication with a mobile station from one cell to another cell.

Advantageously, and in accordance with a first embodiment of the present invention, the monitoring step comprises monitoring information elements within the signalling messages and the establishing step comprises comparing common information elements contained within each of the messages of a pair of messages.

Preferably data from a pair of messages is only utilised if the messages are monitored within a pre-determined time period of each other. It is difficult to identify messages on the Abis interface which relate to the same transaction, because signalling messages on the Abis interface do not carry identification information which is unique within the network. By utilising only messages which are monitored within a predetermined period of each other, the likelihood that these messages belong to the same transaction is increased. Preferably the time period is one which is typical for the time interval between the messages being monitored.

Advantageously, the determined allocated frequency and code for a cell is associated with a radio element of the cellular mobile radio network which provides radio coverage within that cell. Thus, for a GSM type cellular mobile radio network the beacon frequency and BSIC of a cell are associated with the TRX to which handover signalling messages have been sent.

Alternatively, or additionally and in accordance with a second embodiment of the present invention, the monitoring step comprises monitoring addressing information within the signalling messages and the establishing step comprises comparing the addressing information for a pair of signalling messages to determine whether the pair of signalling messages have been sent over the same signalling path of the cellular mobile radio network. Thus, where unique addressing information is available, for example on the A interface of a GSM type network, this is utilised to determine if a pair of messages are related to the same event within the network.

According to a second aspect of the present invention, there is provided apparatus for determining information about a cellular mobile radio network comprising a fixed part providing radio coverage in a plurality of cells, and mobile stations for communicating with said fixed part, the network broadcasting to all mobile stations within each cell a frequency allocated to the cell by the network operator and a code allocated to the cell by the network operator, the apparatus comprising probe means for monitoring signalling messages passed between network elements of the cellular mobile radio network, selecting means for selecting a pair of signalling messages in accordance to predetermined selection criteria, and analysis means for establishing if the pair of messages are related to the same event within the network, and if so, extracting data from the pair of messages and determining from the extracted data the allocated frequency and code for each cell.

BRIEF DESCRIPTION OF THE DRAWINGS

Embodiments of the present invention will now be described, by way of example only, and with reference to the following drawings in which.

DESCRIPTION OF THE INVENTION

Embodiments of the present invention will be described with reference to a cellular mobile radio network operating in accordance with the GSM technical specifications. The GSM technical specifications as published by the European Telecommunications Standards Institute (ETSI secretariat, F-06921 Sophia Antipolis CEDEX, France, e-mail: secretariat@etsi.fr) are hereby incorporated herein by reference.

Figure 1:
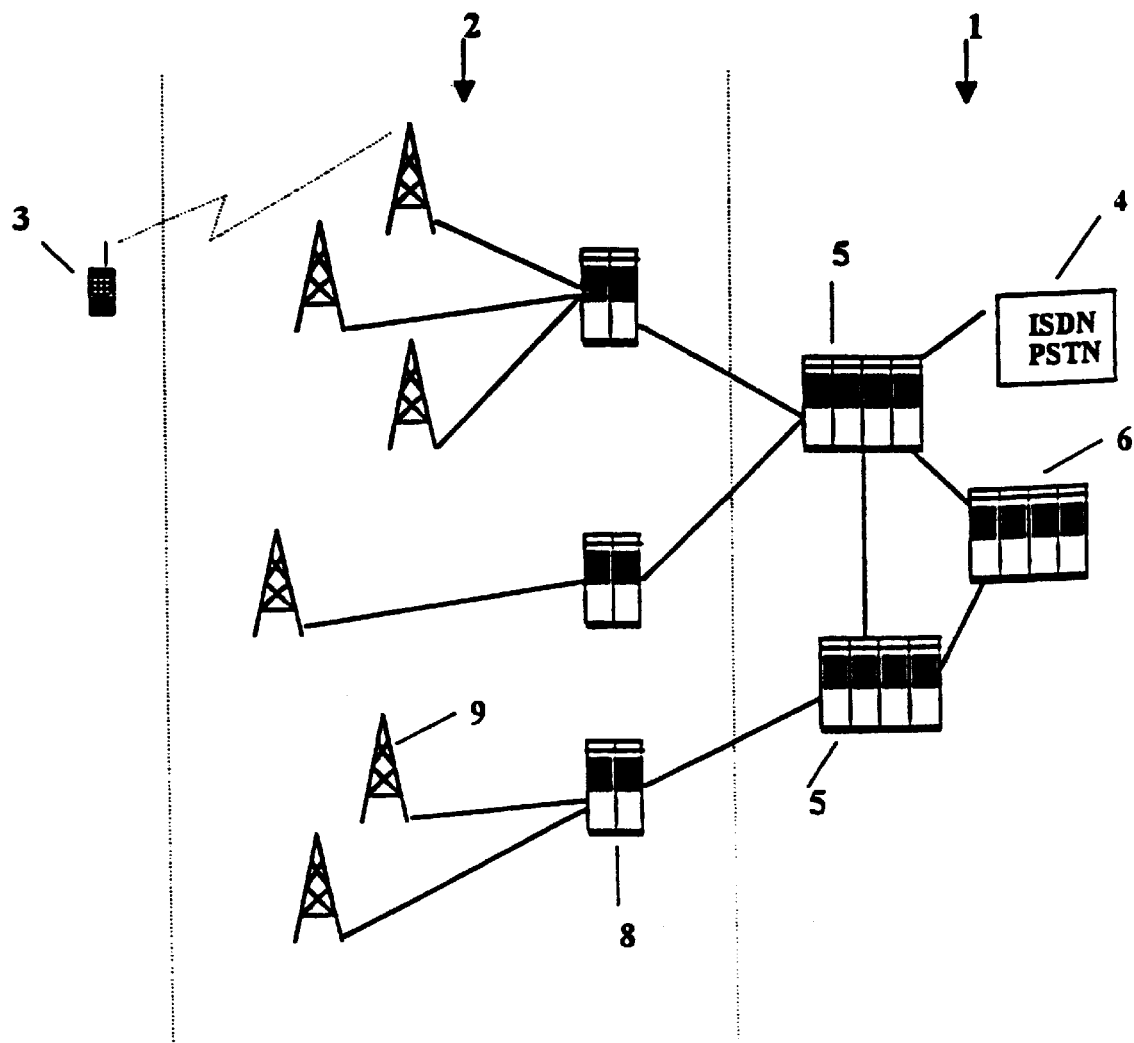
FIG. 1 is a schematic diagram of a GSM-type mobile communications network.

With reference to FIG. 1, a GSM network comprises a Network and Switching Subsystem (NSS) 1, which connects with a plurality of Base Station Subsystems (BSS) 2. The BSS provide radio communication with mobile stations 3 (only one of which is shown in FIG. 1). The NSS 1 also communicates with the fixed public network 4 (i.e. with the Public Switched Telephone Network—PSTN, and the Integrated Services Digital Network— ISDN). The NSS 1 comprises a number of Mobile Switching Centres (MSC) 5, Home Location Registers (HLR) 6, and Visitor Location Registers (VLR) 7. MSCs perform the function of switches, in a similar manner to PSTN switches, but also deal with the additional functionality required for mobile networks e.g. registration, authentication location updating, international roaming, connection to the PSTN. HLRs contain information on subscribers to the mobile network e.g. location, mobile identity, while VLRs contain a subset of the HLR information which is required when a mobile station is in a particular geographical location.

Figure 2:
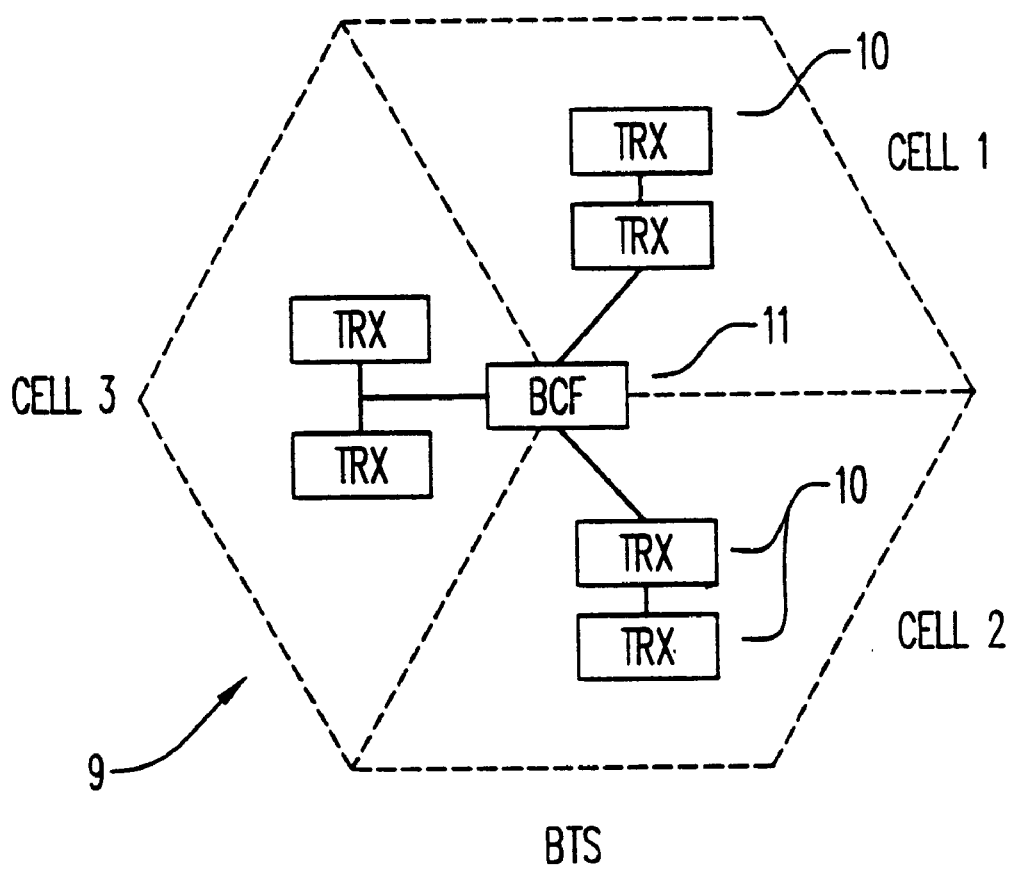
FIG. 2 is a schematic diagram of a three sector BTS showing the TRXs serving each cell.

Each BSS 2 comprises a Base Station Controller (BSC) 8 and a plurality of Base Transceiver Stations (BTS) 9. Referring now to FIG. 2 each BTS 9 comprises one or more elementary transceivers (TRX) 10 and at least one Base Controller Function (BCF) 11. Each TRX 10 can emit and receive radio signals and provides radio coverage over a local area known as a cell. The number of TRXs per cell and the number of cells per BTS is dependent on the traffic capacity that the network operator wishes to cater for.

The radio interface between a mobile station 3 and BTS 9 is standardized within a GSM network. Similarly, the interface between each BTS 9 and its associated BSC 8, by which user data and signalling are exchanged, is also standardized, and is known as the Abis interface. Each BSS 2 communicates with an MSC 5 over a standardized interface known as the A interface.

Figure 3:
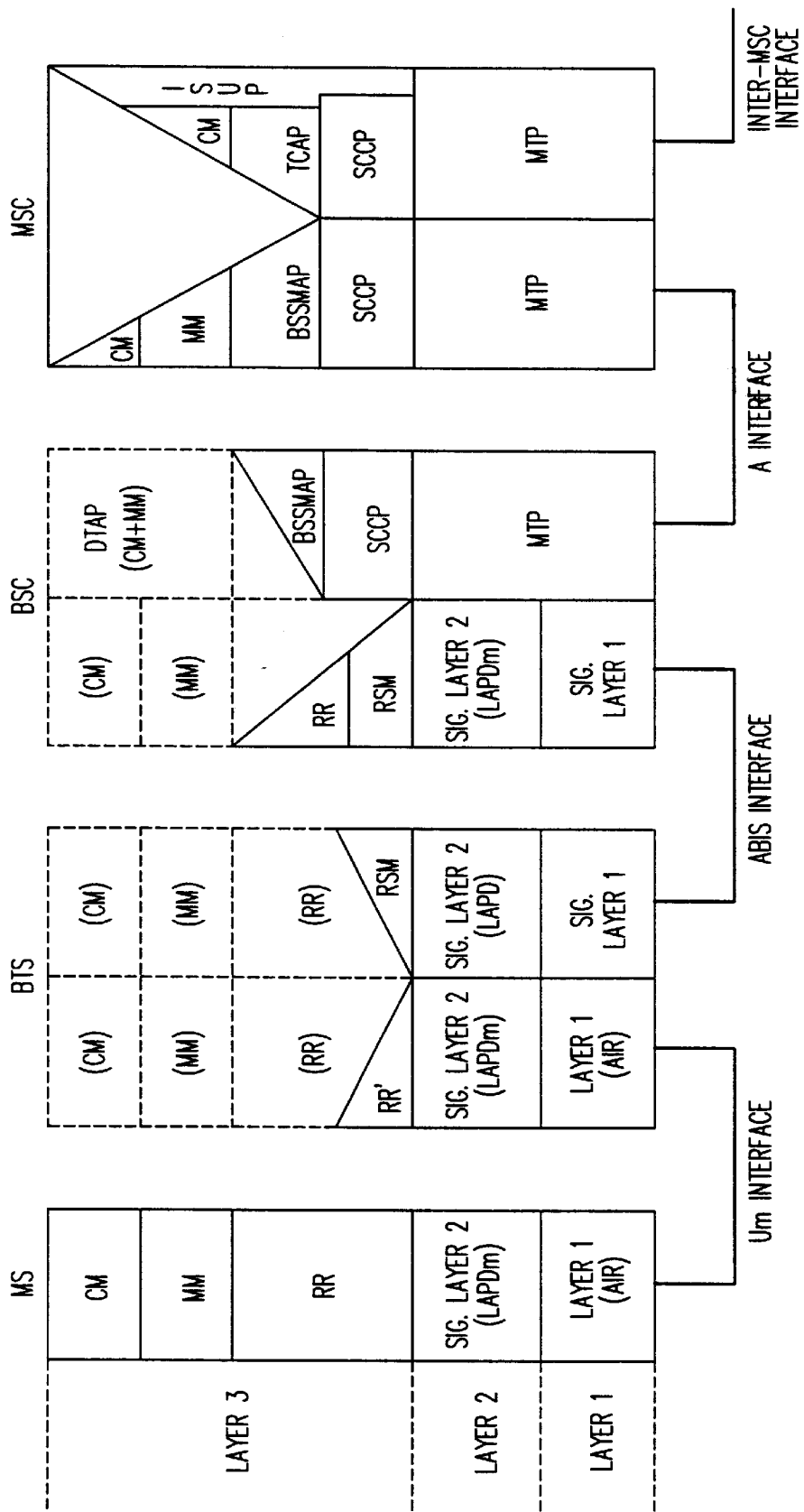
FIG. 3 is diagram showing the relationships between various protocols used in GSM networks.

In GSM networks, user data and signalling are multiplexed across the radio interface, the Abis interface and the A interface. Signalling within the NSS 1, over the A interfaces to the BSCs 8 and with the PSTN 4, is effected through signalling links which utilise signalling schemes based on the SS7 standard. FIG. 3 illustrates some of the protocols utilised in GSM. A number of the protocols have multiple layers, and in many cases messages are transparent to some of the nodes through which they pass, for example messages from the MS to the MSC will pass transparently through the BTS and BSC. Protocol layers which transparently pass messages through a node are shown as a dashed line in FIG. 3.

Radio Resources Management.

This protocol layer is used for paging, radio channel access, ciphering, handover, radio signal control procedures, and radio signal measurements. RR messages pass between the MS and the BSC, and are transparent to the BTS.

Radio Subsystem Management (RSM).

RSM, although a term of this art, is not an official GSM name, and is often referred to by the GSM technical specification which describes these messages i.e. GSM08.58. RSM messages relate to the management of radio resources by the BTS. These messages appear only on the Abis interface and are carried by the LAP D protocol.

Call Management (CM).

The Call Management protocols comprises Call Control (CC), Short Message Service (SMS) and Supplementary Services (SS). CM messages pass transparently from the MS through the BTS and BSC to the MSC.

Mobility Management (MM).

As for CM messages, MM messages pass between the MS and MSC, and are transparent to the BTS and BSC.

BSS Management Application Part (BSSMAP).

BSSMAP messages pass between the BSC and MSC and are used to manage resources at the BSC. These messages are passed across the A interface via MTP (Message Transfer Part) and SCCP (Signalling Connection Control Part) protocols which are both based on the SS7 standard.

Layer 1, the signalling layer of the Abis interface, is digital, usually at a data rate of 2048 kbit/sec with a frame structure of 32×64 kbit/sec time slots [ITU-T G.703]. It is these time slots that are monitored in accordance with embodiments of the present invention.

Layer 2 of the Abis interface is based on a standard ISDN protocol called LAPD (Link Access Procedure on the D-channel). This is defined by CCITT recommendation Q.920 and Q.921 and in Europe by ETS 300125 produced by ETSI. LAPD provides for the identification of the terminal end points of a data link by the use of TEIs (Terminal Endpoint Identifiers) in the address field of each frame. GSM has adopted the use of TEIs for the addressing of TRXs by BTS's.

Layer 3 is the layer in which messages are carried, in the Abis interface within the RR and RSM protocols, and on the A interface within the BSSMAP and SCCP protocols.

Beacon Frequency

Due to the scarcity of available radio spectrum a MS does not have a dedicated radio channel at all times but rather is allocated a dedicated channel only when the need arises. However, at other times the MS must stay in contact with the BSC in order to intercept paging messages and to monitor the radio environment in order to evaluate its quality and to choose the most suitable base station. Furthermore, once a dedicated channel is required, the MS and the base station need to exchange information to achieve a successful transition of the MS to a dedicated channel. There are thus provided a number of common channels to which all MS's listen, these are:

FCCH—Frequency Correction CHannel
BCCH—Broadcast Control CHannel
SCH—Synchronisation Channel
PAGCH—Paging and Access Grant Channel
RACH—Random Access Channel Within each cell these common channels are broadcast on the same frequency which is known as the beacon frequency. In GSM networks these beacon frequencies are 200 kHz apart and each network operator would typically have between twenty and thirty beacon frequencies within their allocated radio spectrum. Clearly, beacon frequencies must be reused in different cells and it is often possible that a MS can receive two common channels on the same beacon frequency.

Base Station Identity Code

Figure 4:
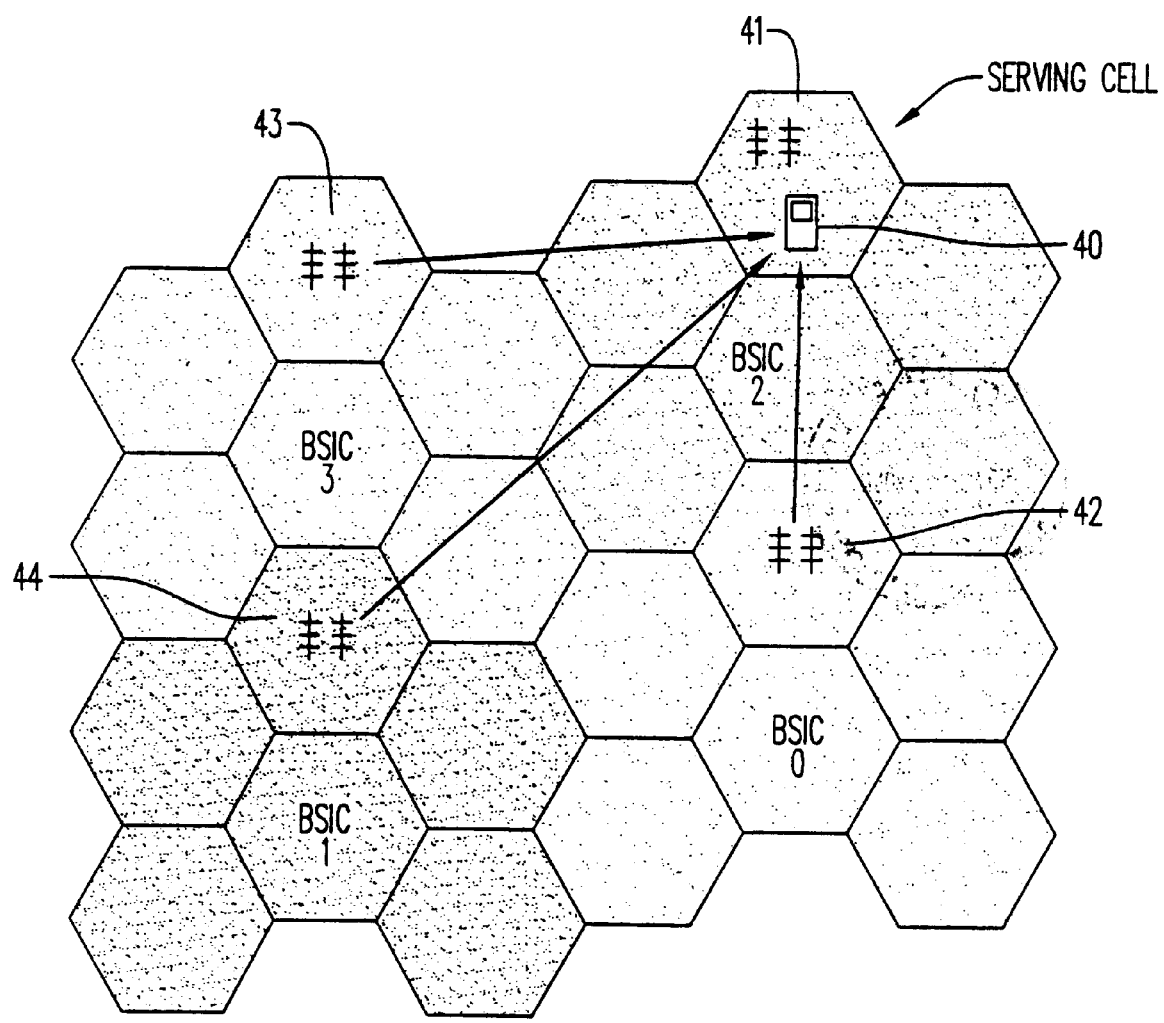
FIG. 4 is a schematic diagram showing the reuse of beacon frequencies and BSICs within cells of a mobile network.

In order for a MS to be able to distinguish between cells transmitting their common channels on the same beacon frequency, a code termed the BSIC (Base Station Identity Code) is also broadcast by each cell. The BSIC is something of a misnomer since it relates more properly to a cell and does not unambiguously identify a base station. The BSIC is a six bit code word that is broadcast on the SCH of every cell and thus is broadcast at the beacon frequency. The first three bits of the BSIC are used to identify the country of the network operator eg the UK has been allocated the numbers two and six. The remaining three bits of the BSIC are used as a "colour code" (by analogy with map colouring) to enable a MS to distinguish between cells which transmit on the same beacon frequency. With reference to FIG. 4, it is normal practise for network operators to allocate the same BSIC to neighbouring cells, in this case groups of six neighbouring cells are shown to utilise the same BSIC. Thus, MS 40 in cell 41 may receive beacon frequencies from three cells 42, 43 and 44 which are all at the same frequency f1. However, by also monitoring the BSIC broadcast by each cell, the MS is able to distinguish between cells having a BSIC respectively of 0, 3 and 1.

Two embodiments of the present invention will be described. In a first embodiment, messages on the Abis interface (and in some cases also the A interface) are monitored to determine the beacon frequency and BSIC of a cell. This information can then be associated with other information relating to the cell eg. the serving TRX, the Cell Identity and Location Area Identifier, determined for example by means of the network discovery techniques of the commonly owned co-pending US patent application referenced above.

In a second embodiment of the present invention, only messages on the A interface are monitored to determine the beacon frequency and BSIC of a cell. This information is then associated with the Cell Identity of the cell which is also determined from messages monitored on the A interface.

First Embodiment

For messages monitored on the Abis interface special techniques are use to label and compare these messages. This requirement stems from the absence of unique network wide addressing information on the Abis interface between radio elements or TRXs, and the BSC. Whereas the SS7 protocols utilised on the A interface provide for the unique identification of A interface links, no such provision is made for Abis links. On the A interface, links have an identification which is given by the Originating Point Code, the Destination Point Code and the Signalling Link Code. Abis interface links have no such identification provided by protocol. Abis interface links are identified implicitly by configuration information stored within the BSC, and TRXs are addressed by using an identifier (a TEI Terminal Endpoint Identifier) which is allocated by the BSC.

Figure 5:
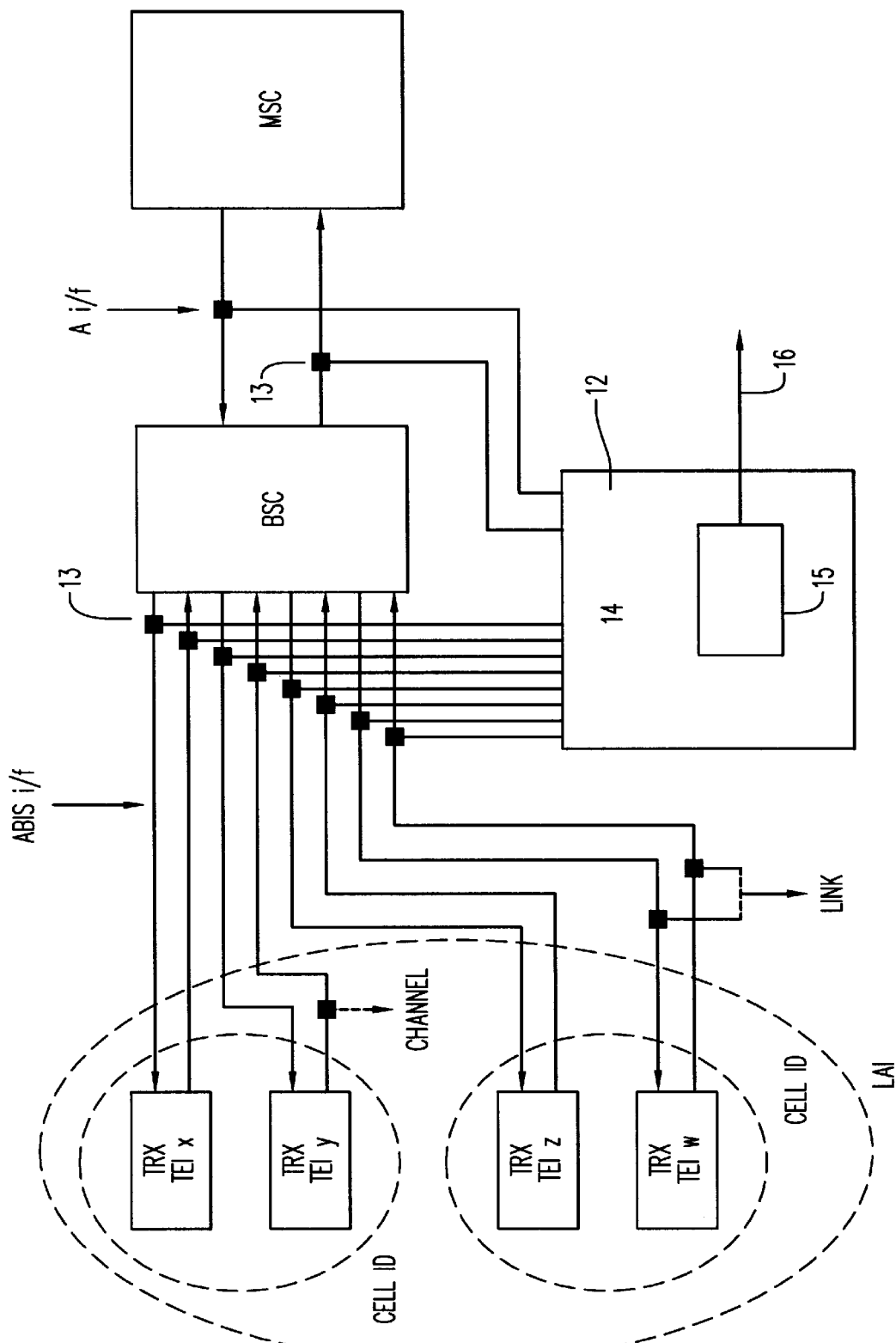
FIG. 5 is a schematic diagram of a monitoring system according to embodiments of the present invention showing its connections to a mobile network.

With reference to FIG. 5, monitoring equipment 12 is utilised to monitor links on both the Abis interface and the A interface of a GSM network. The monitoring equipment 12 comprises probes 13 attached to test points on both the Abis and A interfaces at a BSC site, an HP E4251A Cardcage 14 available from Hewlett-Packard Limited, and an analyser 15, comprising a Hewlett-Packard HP9000 series 800 Unix server, for analysing and correlating the monitored data. A communications link 16 is provided from the analyser 15 so that the results of the autodiscovery of radio elements may be accessed from a remote location. Each probe 13 monitors a particular time slot on a communications bearer on either the Abis or A interface, and is connected to a particular interface card within the Cardcage 14.

The monitoring system 14 is configured to attach a header to each data message monitored by a probe 13. This header comprises a time stamp which records the time at which the monitoring system received the message, event information and a physical identifier, which uniquely identifies the monitored time slot. The event information indicates whether the message has been monitored from, for example, an Abis or an A interface and is recorded for each timeslot by the analyser 15 at the time the probes 13 and monitor system 14 are initially connected to the network. This information may be supplied by the network operator and input to the analyser, or may be deduced by the analyser from messages monitored on each timeslot. The physical identifier attached to the message by the monitoring system may comprise for example the cardcage number of the monitoring system, the interface card number of the cardcage, the bearer number of the communications link being monitored and the time slot number being monitored.

Although the physical identifier attached to the message by the monitoring system allows the time slot on which a message has been monitored to be uniquely identified, a further level of physical identification is required in order to be able to uniquely identify the source or destination of the data message i.e. a TRX. This further level of physical identification is required because within GSM systems it is possible for more than one TRX to send data messages on the same time slot. The final level of physical identification is provided by the TEI which is sent within the layer 2 LAPD. Each time a message is monitored by the monitoring system 14, the analyser 15 extracts the TEI from layer 2 and combines it with information from the header attached by the monitoring system in order to construct a physical identifier as follows:

Physical Identifier: cardcage number; interface card number; bearer number; time slot number; TEI A person skilled in this field will appreciate that alternative monitoring systems may utilise alternative physical identifiers. However, if the network being monitored utilises one timeslot for more than one TRX, the TEI should be used as part of the physical identifier.

Figure 6:
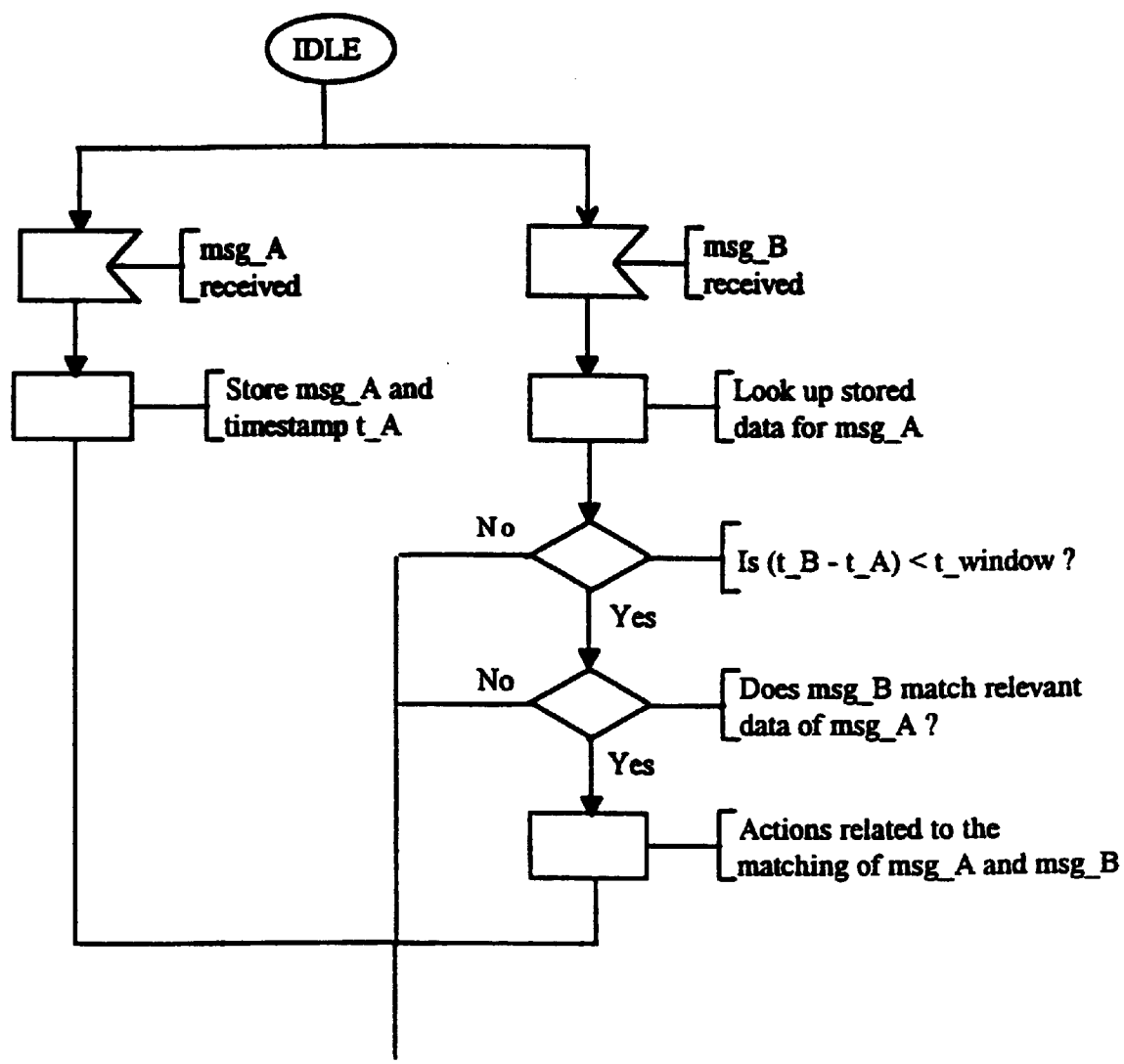
FIG. 6 is a flowchart of the message matching procedure utilised in the first embodiment of the present invention.

When two messages contain common information elements it can be deduced that they relate to the same event within the network, for example to the same handover procedure. Because many signalling messages, particularly on the Abis interface, do not carry data which uniquely identifies their source or origin, a pair of messages containing common information elements may not necessarily be logically related. In order to overcome this difficulty the present embodiment employs a time window when matching messages. The method utilised in the present embodiment to compare or match messages will now be described with reference to FIG. 6.

The first message of type A, of a pair of messages received by the monitoring system 12 is time stamped and stored. When a second message of type B is received by the monitoring system 12 its time of arrival is compared with the time stamp of message A, or if at the time of arrival of the B type message, several A type messages are stored, the B type message arrival time is compared with the timestamps of all A type messages. If the difference in time between the arrival of a B type message and the timestamp of a particular A type message is less than a predetermined time window further processing of the two messages occurs. If the time difference between the B type message and a particular A type message is greater than this time window, this particular A type message is discarded. If the time difference between the B type message and all stored A type messages is greater than the predetermined time window, the B type message is discarded.

If a B type message is within the time window from the arrival of an A type message, the data contained within the B type message is compared to that within the A type message to determine if there are any common information elements. If such common information elements are found, further actions are taken by the analyser 15 which are dependent on the nature of A and B messages, and which will be described in detail below. If common information elements are not found message B is discarded, but message A is retained for matching with further, later messages of type B arriving within the time window.

An additional, optional, further check on the validity of message matching can be carried out. Rather than accepting a message matching as being successful when common information is matched between a message B and one message A, further comparisons with stored messages of type A may be carried out. If the common information element within message B is found within more than one message of type A, within the time window, then these messages are discarded. If, after matching with all messages of type A, the common information element within the B message has been found within only one A message, the message matching is deemed to be successful. Thus, by discarding non unique message matches, greater confidence can be placed in the message matching process. Whether this alternative, more secure, message matching procedure is utilised depends on the relative importance placed by the operator of the discovery method on speed of discovery, level of processing required, and the level of confidence required in the results of the discovery method.

The length of the time window may be different for different message pairs, and should be chosen to be a small multiple of the typical time interval between messages of that type on the network being monitored. In order to choose appropriate time window lengths, messages on the network should be monitored for some time, and the typical intervals between particular messages determined. Time window lengths can then be optimised by trial and error. If time window lengths are too long this will lead to message s being falsely correlated, while if time windows are too short this will lead to an excessive number of messages being discarded and the network discovery method will take an excessively long time to discover the network. The messages monitored to carry out the discovery method should in general be chosen to be ones which appear on the network as often as possible, so as to ensure rapid discovery of the network.

Two procedures for carrying out the first embodiment will be described, both procedures involve the monitoring of messages related to the handover of communications with a MS from one cell to another. Handover may be initiated for a number of reasons for example it may necessary
1) to prevent the loss of a call which is currently in progress,
2) to improve the interference level experienced or
3) to reduce the congestion in the current cell by handover to a neighbouring, less congested, cell.

Figure 7:
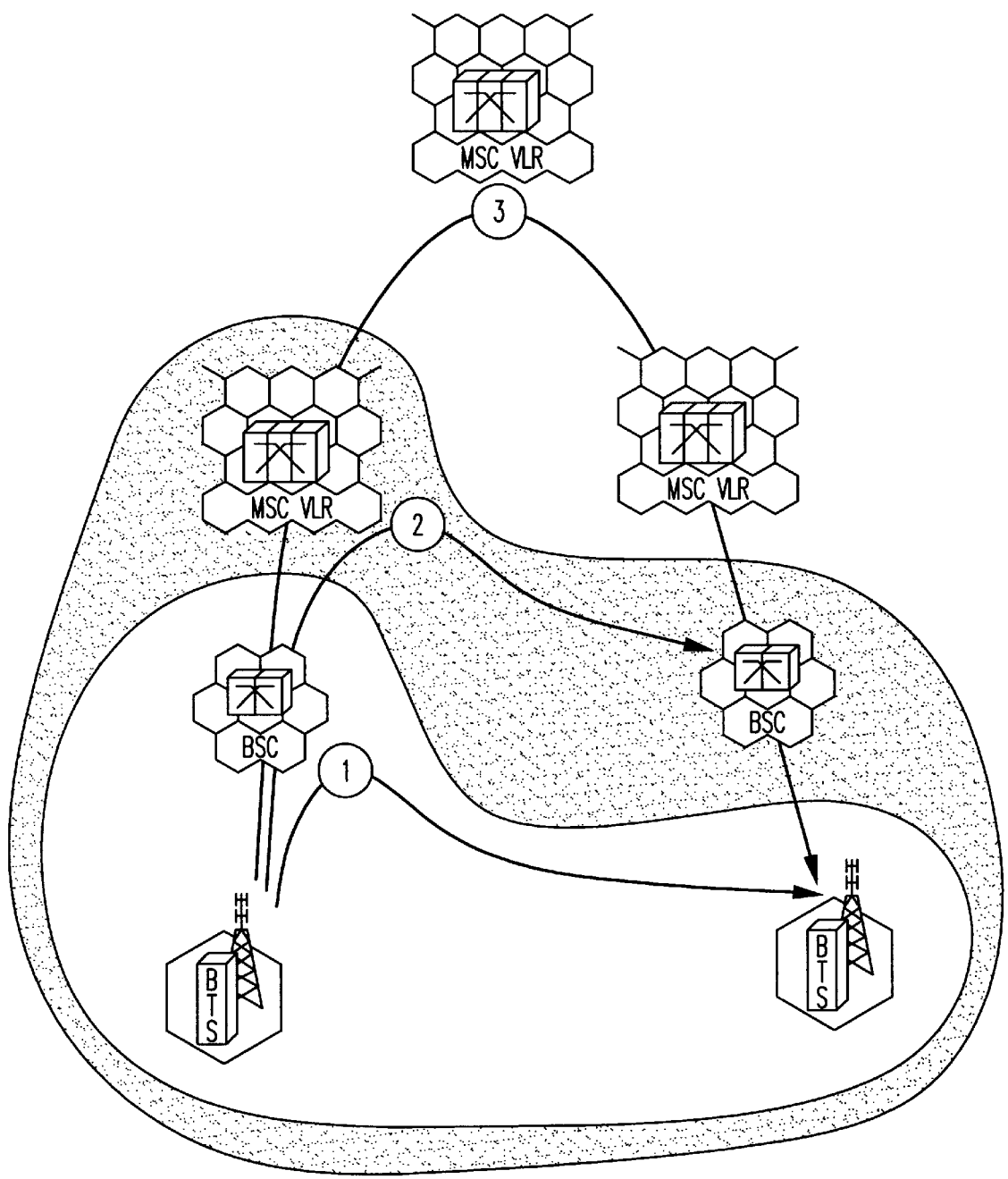
FIG. 7 is a is a schematic diagram showing the various types of handovers found in cellular mobile networks.

Each of these handover situations may require monitoring by the MS or the network of different handover criteria, and the application of different handover algorithms for the handover decision to be made. These algorithms are not prescribed by the GSM Technical Specifications and the network operator has complete freedom choice in this area However, once the handover decision has been made the handover execution process is specified by the Technical Specifications, and for the present purposes it is the messages exchanged as a result of the handover decision that are of significance. The suffix "old" will be used to refer to all network entities along the communications path prior to handover and the suffix "new" will be used to refer to all network entities along the communications path after handover. Once the final decision to attempt handover has been made (this is always made by the old-BSC or MSC) the transfer of communication with the MS from the old cell to the new cell must be coordinated to ensure that the MS has sufficient information to successfully achieve the transfer and that all network entities have the information required to manage the future connection in the new cell. There are a number of different scenarios for handover which are distinguished by the location of the old and new cells. With reference to FIG. 7, the new cell may be controlled
1) by the same BSC as the old cell (intra-BSC handover),
2) by the same MSC, but a different BSC (inter-BSC, intra-MSC handover), or
3) by different MSC's and BSC's via an anchor MSC (inter MSC handover).

However in all cases the old-BSC triggers a series of events which establish the new communication path of the MS and which terminates with the sending of a handover command to the MS which contains all the information the MS requires to access the new channel in the new cell. This handover command (RR HANDOVER CoMmanD [GSM TS 04.08, 9.1.15]) identifies the new cell by its beacon frequency and BSIC, thus by careful matching of messages this information about the new cell can be determined.

Inter-BSC Handover

Figure 8:
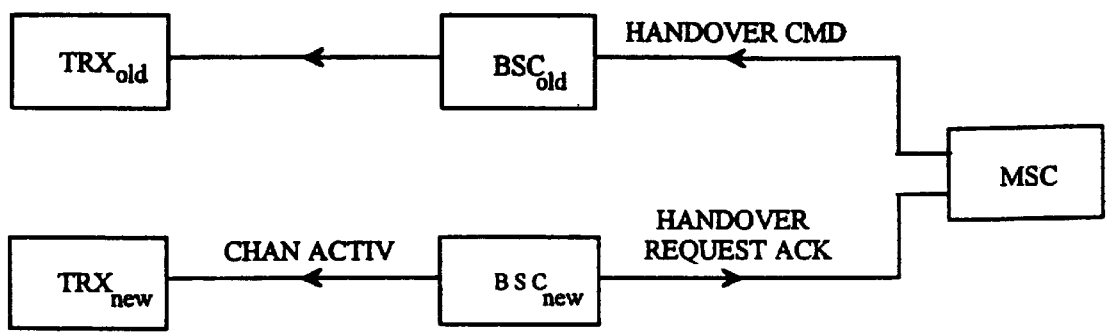
FIG. 8 is a schematic diagram showing the sequence of messages generated during an inter-BSC handover which are utilised in the first embodiment of the present invention.

When the new cell is not under the control of the old-BSC, the old-BSC sends a BSSMAP HANDOVER REQUIRED message to the old-MSC and a new-BSC is contacted (as will be described in greater detail below). The new-BSC sends a CHANnel ACTIVation message [GSM TS 08.58, 8.4.1], within the RSM protocol on the Abis interface, to a TRX within the new cell, as shown in FIG. 8. This message is addressed to the TRX by means of its TEI as discussed above, and contains information on the appropriate transmission modes to employ, timing advance information and initial power settings for the MS. In addition the CHAN ACTIV message contains a handover reference number [GSM TS 04.08, 10.5.2.15] and a channel number [GSM TS 08.58,9.3.1]. The handover reference number is one octet and its purpose is to provide a reference value for access identification throughout the handover. The channel number is also one octet and identifies the channel to be allocated by the new TRX i.e. the channel type, time slot, and potentially sub time slot.

The new-BSC then notifies the controlling MSC that the request to support the handover has been accepted and that a radio channel has been assigned. This is done by building a HANDOVER REQUEST ACKnowledge message [GSM TS 08.08,3.2.1.10] which encapsulates a RR HANDOVER CMD message (and thus contains a full description of the channel assigned and the new cell's beacon frequency and BSIC) and sending this, within the BSSMAP protocol on the A interface, to the MSC as shown in FIG. 8. The MSC in turn forwards this HANDOVER CMD message to the old-BCS which sends it on to the MS via the old-TRX.

The monitoring system 14 monitors for CHAN ACTIV messages on the Abis interface and for HANDOVER REQUEST ACKnowledge messages on the A interface and matches these within a time window as described above with reference to FIG. 6. The common information element sought between these two messages is both the channel number and the handover reference number since both are contained in both messages. An appropriate time window for this matching process has been found to be four seconds. Once a pair of these messages have been successfully matched the BSIC and beacon frequency carried within the RR HANDOVER CMD message (encapsulated within the monitored HANDOVER REQUEST ACK message) is allocated by the analyser 15 to the cell to which the CHAN ACTIV message has been sent (as identified by for example its TRX).

FIG. 11A shows the messages utilised in the present message matching procedure.

Intra-BSC Handover

Figure 9:
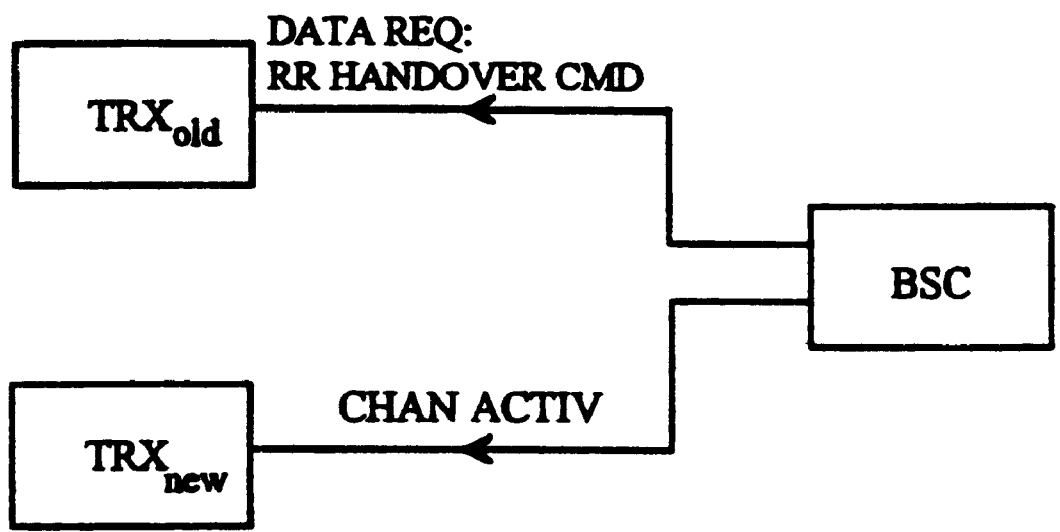
FIG. 9 is a schematic diagram showing the sequence of messages generated during an intra-BSC handover which are utilised in the first embodiment of the present invention.

When the new cell is controlled by the same BSC as the old cell, new-BSC is the same as old-BSC, which simplifies the handover procedure. With reference to FIG. 9, a CHAN ACTIV message is sent to the new TRX to inform it of the new channel. However, in this case the handover command sent to the old-TRX can be sent directly by the BSC. A RR HANDOVER CMD message is encapsulated within a DATA REQuest message [GSM TS 08.58, 8.3.1] and sent to the old-TRX on the Abis interface within the RSM protocol. The HANDOVER CMD message also contains both the handover reference number and the channel number of the channel allocated to the MS in the new cell, which are utilised as the common information elements. The monitoring system 14 thus monitors the Abis interface for CHAN ACTIV and DATA REQ messages and matches these within a time window as described above. An appropriate time window for this matching process has been found to be four seconds. The BSIC and beacon frequency is extracted by the analyser 15 and allocated to the cell to which the CHAN ACTIV message has been sent.

Figure 11:
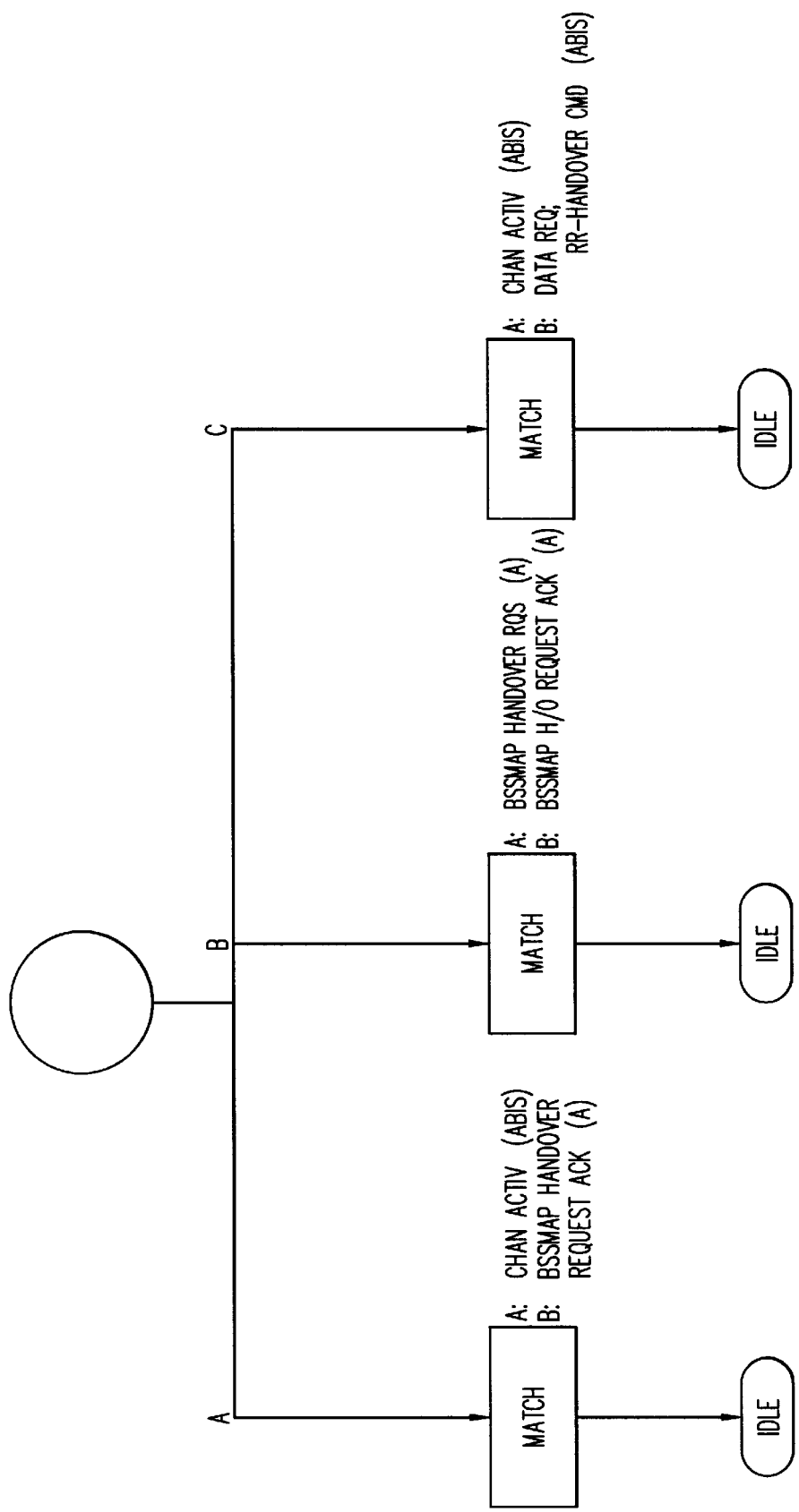
FIG. 11 is a flowchart showing the messages utilised in the message matching procedures of both embodiments of the present invention.

FIG. 11 at C shows the messages utilised in the present message matching procedure.

Inter-MSC Handover

For the present purposes of determining the BSIC and beacon frequency of a cell, inter-MSC handovers may be treated in the same manner as inter-BSC handovers. Although there are additional steps that are taken by the network during this type of handover, the same two messages ie the CHAN ACTIV message sent to the new-TRX and the HANDOVER REQUEST ACK message sent from the new-BSC, can be used to determine the BSIC and beacon frequency of the new cell.

Second Embodiment

A second embodiment of the present invention utilises only messages sent on the A interface to determine the BSIC and beacon frequency for a cell and to associate these with the cell identity.

Messages passed between a BSC and a MSC on the A interface utilise a connection-oriented protocol, namely the SS7 SCCP protocol in class 2 mode. More particularly, the initial connection-establishment message passed from the BSC to MSC initiates the set up of an SCCP connection and in doing so passes the MSC a local reference that the MSC must use in subsequent communications with the BSC for the transaction to which the connection establishment relates. In replying to the initial message from the BSC, the MSC uses the BSC local reference as the destination source reference for the reply and includes its own local reference as the source local reference of the reply. In subsequent communications for the transaction, the BSC uses the MSC's local reference as the destination local reference for its messages to the MSC. By noting these local references, the present monitoring system can identify all messages relating to the same SCCP connection. The association of local references with a particular SCCP connection only lasts for the duration of that connection.

Figure 10:
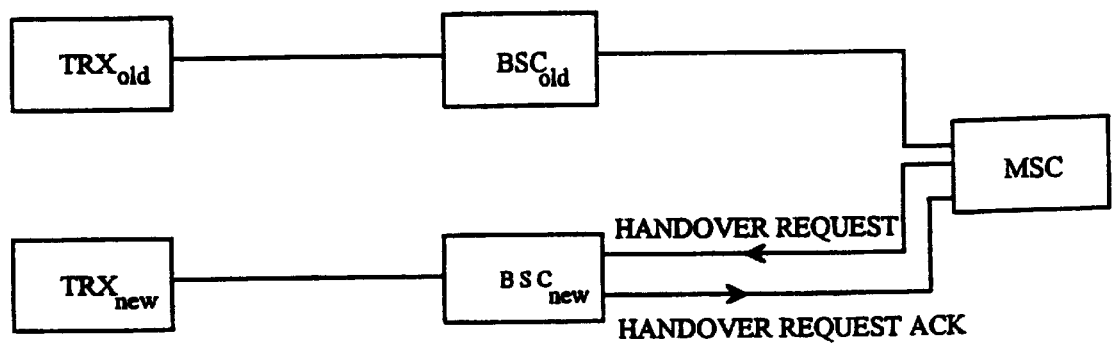
FIG. 10 is a schematic diagram showing the sequence of messages generated during an inter-BSC handover which are utilised in the second embodiment of the present invention.

With reference to FIG. 10, when an inter-BSC handover is initiated the MSC serving the two BSCs involved in the handover sends a HANDOVER REQUEST message [GSM TS 08.08, 3.2.1.8] to the new-BSC. This HANDOVER REQUEST message is sent within the BSSMAP protocol on the A interface, and contains both the Cell Identity for the old cell and also for the new cell. In response to the HANDOVER REQUEST message the new-BSC sends a HANDOVER REQUEST ACKnowledge message [GSM TS 08.08, 3.2.1.10], which as discussed above contains an encapsulated HANDOVER CMD message. This HANDOVER CMD message contains the BSIC and beacon frequency of the new cell. Since the HANDOVER REQUEST ACK message is sent to the MSC on the A interface during the same SCCP connection as the HANDOVER REQUEST message which caused it, these two messages can be matched. Thus SCCP header information is monitored by probes 13 on the A interface and the analyser 15 is arranged to match HANDOVER REQUEST messages and HANDOVER REQUEST ACKnowledge messages having the same source and destination local references. Further details of the tracking of SS7 SCCP addressing information on the A interface can be found in co-pending U.S. patent application Ser. No. 08/851,041, which is incorporated herein by reference.

The HANDOVER REQUEST ACK message although containing the BSIC and beacon frequency of the new cell, does not contain the Cell Identity for the new or old cells, thus necessitating matching with the associated HANDOVER REQUEST message. Once a successful match has been found the BSIC and beacon frequency from the HANDOVER REQUEST ACK message are allocated to the new cell, as identified by the Cell Identity from the HANDOVER REQUEST message.

FIG. 11 at B shows the messages utilised in the present message matching procedure.

What is claimed is:

1. A network discovery method for determining information about a cellular mobile radio network comprising a fixed part providing radio coverage in a plurality of cells, and mobile stations for communicating with said fixed part, the network broadcasting to all mobile stations within each cell a frequency allocated to the cell by the network operator and a code allocated to the cell by the network operator, the method comprising:

monitoring signalling messages passed between network elements, selecting a pair of signalling messages in accordance to predetermined selection criteria, establishing if said pair of messages are related to the same event within the network, and if so, extracting data from said pair of messages and determining from the extracted data the allocated frequency and code for each cell.

2. A network discovery method as claimed in claim 1, wherein the selection criteria are that the messages relate to the handover of communication with a mobile station from one cell to another cell.

3. A network discovery method as claimed in claim 1, wherein the monitoring step comprises monitoring information elements within the signalling messages and the establishing step comprises comparing common information elements contained within each of the messages of said pair of messages.

4. A network discovery method as claimed in claim 3, wherein data from said pair of messages is only utilised if the messages are monitored within a predetermined time period of each other.

5. A network discovery method as claimed in claim 3, wherein the determined allocated frequency and code for a cell is associated with a radio element of the cellular mobile radio network which provides radio coverage within that cell.

6. A network discovery method as claimed in claim 1, wherein the monitoring step comprises monitoring addressing information within the signalling messages and the establishing step comprises comparing said addressing information for said pair of signalling messages to determine whether said pair of signalling messages have been sent over the same signalling path of the cellular mobile radio network.

7. A network discovery method as claimed in claim 6, wherein the cellular mobile radio network is of the GSM type and said signalling path is across the A interface.

8. A network discovery method as claimed in claim 1, wherein the cellular mobile radio network is of the GSM type.

9. A network discovery method as claimed in claim 8, wherein messages are monitored on the Abis interface.

10. Apparatus for determining information about a cellular mobile radio network comprising a fixed part providing radio coverage in a plurality of cells, and mobile stations for communicating with said fixed part, the network broadcasting to all mobile stations within each cell a frequency allocated to the cell by the network operator and a code allocated to the cell by the network operator, the apparatus comprising:

probe means for monitoring signalling messages passed between network elements of the cellular mobile radio network, selecting means for selecting a pair of signalling messages in accordance to predetermined selection criteria, and analysis means for establishing if said pair of messages are related to the same event within the network, and if so, extracting data from said pair of messages and determining from the extracted data the allocated frequency and code for each cell.

* * * * *